July 2, 1929.  L. S. UHLER  1,719,205

MOTION PICTURE MACHINE

Filed Feb. 17, 1927  2 Sheets-Sheet 1

INVENTOR.
Louis S. Uhler.
BY
ATTORNEY.

July 2, 1929.  L. S. UHLER  1,719,205
MOTION PICTURE MACHINE
Filed Feb. 17, 1927   2 Sheets-Sheet 2
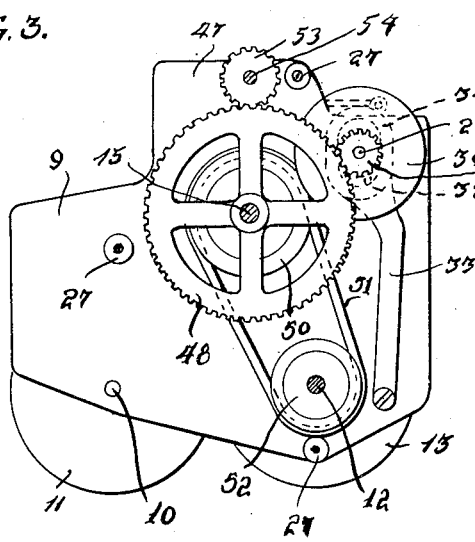
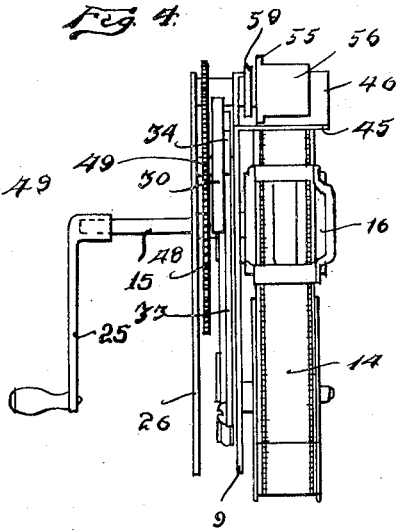
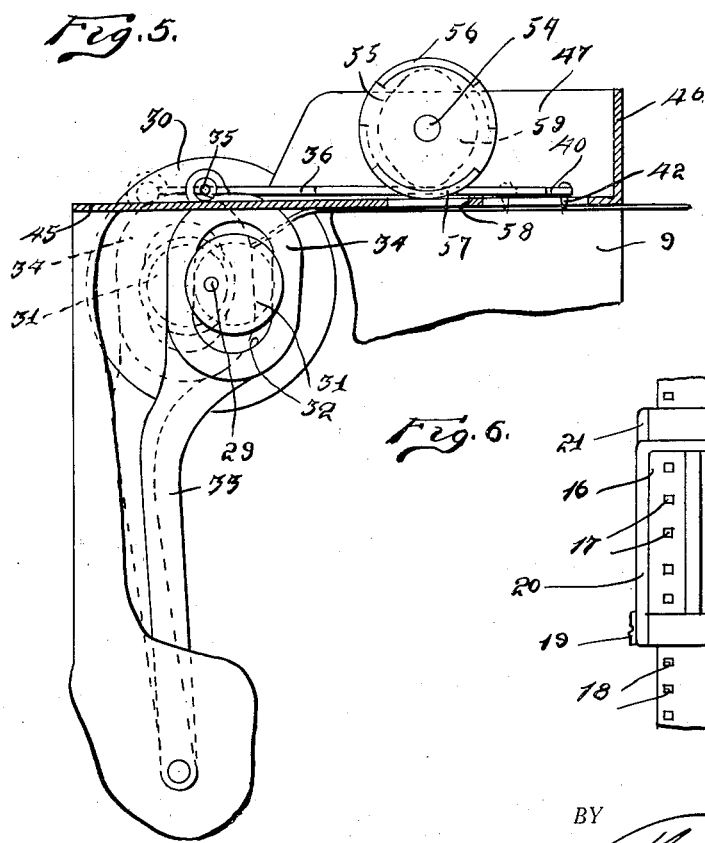
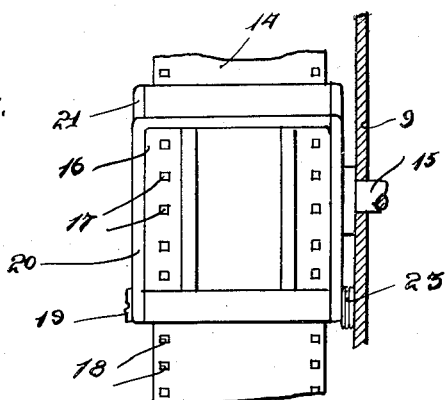
INVENTOR.
Loris S. Uhler.
BY
ATTORNEY.

Patented July 2, 1929.

1,719,205

UNITED STATES PATENT OFFICE.

LOUIS S. UHLER, OF DETROIT, MICHIGAN.

MOTION-PICTURE MACHINE.

Application filed February 17, 1927. Serial No. 168,882.

My invention relates to a new and useful improvement in a motion picture machine, and is adapted for use on either a camera or a projecting machine, and relates particularly to a film actuating mechanism and the shutter for controlling the light through the film.

It is an object of the present invention to provide in a mechanism of this class a shutter which will permit access to the film of a maximum amount of light.

Another object of the invention is the provision of a positively driven and positively operating mechanism for accelerating the film at those positions where the shutter is closed so as to prevent access of light to the film, and releasing the film when the light is delivered thereto.

Another object of the invention is the provision of a cam driven reciprocatory means for accelerating the film and positively feeding the same before the shutter.

Another object of the invention is the provision of a rotatable shutter for controlling the delivery of light to the film.

Other objects will appear hereinafter.

The invention consists in the combination and arrangement of parts hereinafter described and claimed.

The invention will be best understood by a reference to the accompanying drawings which form a part of this specification, and in which, Fig. 1 is a side elevational view of the invention, with parts broken away and parts shown in section.

Fig. 3 is a view taken on substantially line 3—3 of Fig. 2.

Fig. 4 is an end elevational view of the invention.

Fig. 5 is a fragmentary view taken on substantially line 5—5 of Fig. 2.

Fig. 6 is an enlarged side elevational view of the film engaging member.

Figure 1:
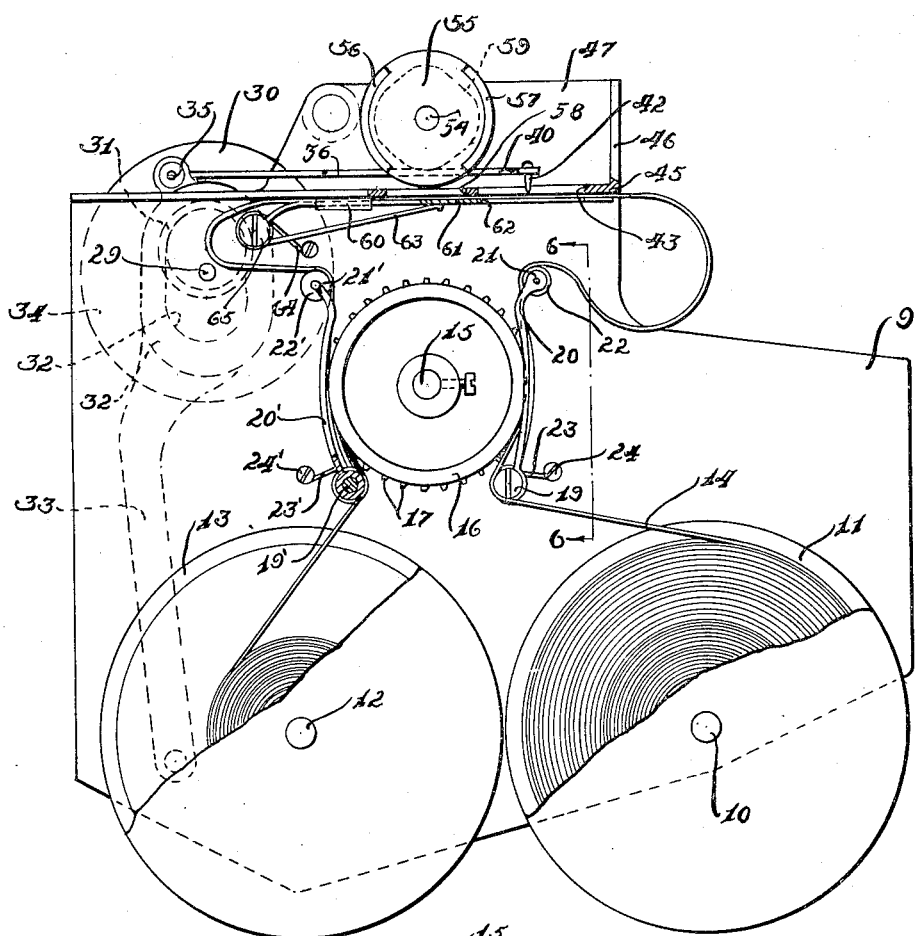
Figure 2:
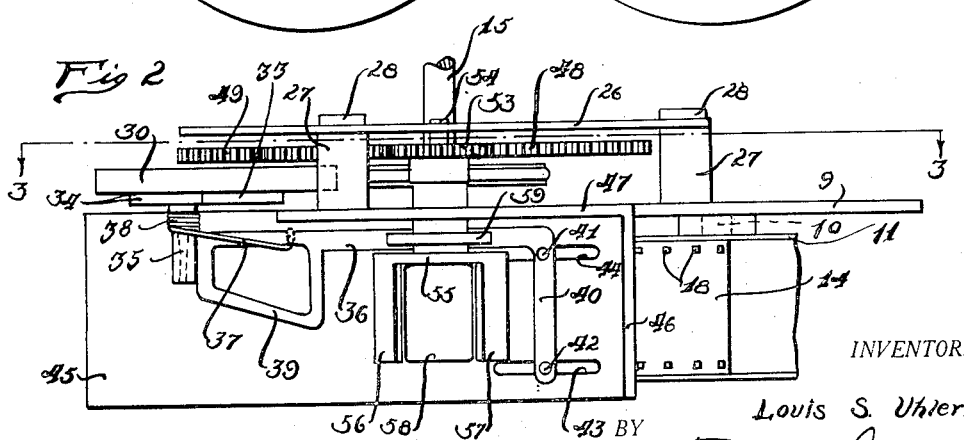
Fig. 2 is a top plan view of the invention with a part broken away.

In the device there is used a supporting plate 9 which is made preferably from metal or other rigid material sufficiently strong to support the mechanism mounted thereon. Mounted in the plate 9 and projecting outwardly from one face thereof is an axle 10 upon which is rotatably mounted the film spool 11. Mounted in the plate 9 and projecting from the same face thereof is the axle 12 upon which is mounted the film winding spool 13, the film 14 being wound on the spool 11 when mounted on the shaft 10 and unwound therefrom on to the spool 13. Projected through the plate 9 and rotatable is a shaft 15 upon which is mounted the film feeding drum 16 having a pair of rows of teeth 17 projecting therefrom and adapted for engaging in the perforations 18 formed at opposite edges of the film 14. Swingably mounted on a stud 19 which projects outwardly from the plate 9 is a film pressing frame 20 which has its free end 21 angularly turned and provided with a roller, this film pressing frame being normally held in position by a spring 23, one end of which engages the screw 24 against the film, so as to retain it pressed against the feeding drum 16, so that the teeth 17 will engage in the perforations 18, and serve, upon a rotation of the drum 16 which is fixedly mounted on the shaft 15, to unwind the film 14 from the spool 11. A similar stud 19' is provided upon which is swingably mounted the film pressing frame 20' having its end 21' angularly offset, and carrying the roller 22', the spring 23' engaging the screw 24'. A crank handle 25 is mounted upon the shaft 15 for effecting a rotation of the same.

A bearing plate 26 is mounted by means of the screws 28 and the spacing sleeves 27 upon the plate 9 in spaced relation thereto. Projected through the plate 26 and the plate 9 is a shaft 29 upon which is fixedly mounted the disc or fly wheel 30 carrying on its inner face the eccentrically mounted cam forming disc 31 which is adapted to engage in the slot 32 formed in the head 34 of the arm 33 which is pivotally mounted at one end on the plate 9. Projecting from the head 34 is a stud 35 engaging in a sleeve formed on a film actuating arm 36 which is normally held by the arm 37 of the spring 38 in elevated or spaced relation to the horizontally extending plate 45 which is mounted upon the plate 9. Projecting outwardly from the arm 36 is a film pressing frame or projection 39. Projecting laterally from the free end of the arm 36 is an arm 40 carrying depending studs or pins 41 and 42 which are spaced apart so that they may engage in the perforations 18 of the film 14 as it is moved past or into registration with the slots 43 and 44 which are formed in the plate 45. Projecting upwardly from the end of the plate 45 is an end plate 46, a portion 47 of the plate 9 also projecting upwardly beyond the upper surface of the plate 45. Fixedly mounted upon the shaft 15 between the plates 9 and 26 is a large gear wheel 48 adapted to mesh with the small gear wheel 49 which is fixedly mounted upon the shaft 29 so that as the gear 48 is rotated the disc or fly wheel 30 is also rotated.

Fixedly mounted upon the shaft 15 between the plate 9 and the gear 48 is a sheave wheel 50 which is adapted to drive by means of the belt 51 a sheave wheel 52 which is fixedly mounted upon the shaft 12. The gear 48 also meshes with a gear 53 which is fixedly mounted upon a shaft 54 projected through the plates 9 and 26, this gear 53 being positioned between the plates. Mounted upon the end of the shaft 54 is a disc 55 projecting outwardly from which at diametrically opposite sides, are arcuate shutter members 56 and 57 which extend over the plate 45 at that position in which the opening 58 is provided.

Mounted on the shaft 15 intermediate the plate 47 and the disc 55 is a cam 59 which is adapted to normally maintain contact with the actuating arm 36.

Mounted on the undersurface of the plate 45 at its outer edge is a guide strip 60. A presser plate 61, having the slots 62 formed therein in registration with the slots 43, is swingably mounted on the stud 65 which projects outwardly from the plate 9, this presser plate being retained in close engagement with the undersurface of the plate 45 by means of the arm 63 of a spring which is coiled about the stud 65, the opposite end 64 thereof engaging a screw in the plate 9.

It will be noted that the presser plate 61 is not provided with an opening registering with the opening 58 formed in the plate 45.

In operation, after the film roll has been placed as shown in Fig. 1, a rotation of the sleeve 15 will effect a feeding of the film 14 from the spool 11, this film passing between the presser plate 61 and the plate 45, bringing the perforations 18 into registration with the slots 62 and 43 and 44. In the form shown in Fig. 1, a slightly further rotation of the shaft 15 will move the arm 40 toward the right, approaching the end of the slots 43 and 44. When this arm has been moved to its limit of movement through the operation of the cam 31 riding in the slot 32, the cam 59 will engage the arm 36 and press it downwardly, so that the pins 41 and 42 will engage in the perforations 18. As these pins engage in these perforations, the shutter members 56 and 57 will be so positioned as to prevent entry of light through the opening 58 and these shutter members will remain in this operative position during a further rotation of the shaft 15, until the arm 36 is moved toward the left, this movement being a quick movement and carrying with it the film 14 through the engagement of the pins 41 and 42 in the perforations 18. As the movement continues and the cam 59 further rotates, the spring arm 37 will raise the arm 36 so as to disengage the pins 41 and 42 from the perforations, and then the light will have access through the opening 58 on account of the position of the shutter members 56 and 57. At the same time, the film roll 13 is being driven by the belt 51, so that the film roll will then wind up the surplus as the arm 36 is travelling to the right to again engage in the perforations. As the arm moves to the left, it carries the film at a greater speed than the film is being wound on the roll 12, so that a retarding and accelerating of the film at the various positions is effected.

By forming the shutter members in the manner indicated it is not necessary that the disc 55 be rotated so as to entirely bring the space between the ends of the shutter members 56 and 57 out of registration with the opening 58, but this rotation must be effected only to that degree that the upper end of one of the shutter members will overlap the lower end of the other, thus permitting a maximum amount of exposure, that is, an exposure during a maximum amount of rotation of the disc 55, so that a longer exposure may be had, thus resulting in clearer pictures, and more sharply outlined.

The use of the cam driven feeding arm is one which effects a very simple and positive movement of the film, while at the same time, reducing to a minimum the likelihood of damaging the film in its feeding operation.

It is believed that the simplicity of the device is evident from the description given, the number of parts being reduced to a minimum, so that the likelihood of the device becoming inoperative through some of the parts becoming disarranged is reduced to a minimum.

While I have illustrated and described the preferred form of my invention I do not wish to limit myself to the precise details of structure given, but desire to avail myself of such variations and modifications as may come within the scope of the appended claims.

Having thus described my invention what I claim as new and desire to secure by Letters Patent is:

1. In a moving picture machine having film winding reels for winding a film thereon and means for unwinding said film for passage across an exposure orifice: a rotatable member; a cam eccentrically mounted on said member; an arm pivotally mounted at one end and rockable through engagement with said cam; an accelerating arm pivotally attached at one end to the free end of said pivotally mounted arm; film engaging means on said accelerating arm; means for normally retaining said film engaging means free from engagement with said film; and a cam for retaining said film engaging means in engagement with said film upon travel of said accelerating arm in one direction, said accelerating arm being reciprocated upon the rotation of said rotatable member.

2. In a moving picture machine having a winding reel and an unwinding reel and provided with feeding mechanism for feeding the film from the reel across an exposure orifice: an arm pivotally mounted at one end and provided with an elongated slot at its opposite end; a rotatable cam engageable in said slot; a film accelerating arm pivotally mounted to the slotted end of said arm and reciprocable upon the rotation of said cam; means on said accelerating arm for engaging a film; resilient means for normally retaining said engaging means out of engagement with said film; and means engageable with said accelerating arm for forcing said engaging means into engagement with said film against the pressure of said resilient means at predetermined positions of movement of said accelerating arm.

3. In a moving picture machine having a winding reel and an unwinding reel, and provided with mechanism for feeding the film from the unwinding reel across an exposure orifice: rotatable means for controlling passage of light through said exposure orifice; a cam carried by and rotatable with said means; an arm pivotally mounted at one end; a rotatable cam engageable with said arm and effecting, upon rotation, a rocking of said arm; an actuating arm pivotally mounted to said rockable arm; film engaging means on said actuating arm and adapted for engaging said film; resilient means for normally retaining said engaging means in non-engagement with said film, said first mentioned cam effecting a movement, at predetermined positions of its rotation, of said engaging means into engagement with said film against the tension of said resilient means.

4. In a moving picture machine having a winding reel and an unwinding reel, and provided with mechanism for feeding the film from the unwinding reel across an exposure orifice: rotatable means for controlling passage of light through said exposure orifice; a cam carried by and rotatable with said means; an arm pivotally mounted at one end; a rotatable cam engageable with said arm and effecting, upon rotation, a rocking of said arm; an actuating arm pivotally mounted to said rockable arm; film engaging means on said actuating arm and adapted for engaging said film; resilient means for normally retaining said engaging means in non-engagement with said film, said first mentioned cam effecting a movement, at predetermined positions of its rotation, of said engaging means into engagement with said film against the tension of said resilient means; and means operable upon rotation of said reels for effecting a rotation of said cams.

In testimony whereof I have signed the foregoing specification.

LOUIS S. UHLER.